US009568146B1

(12) United States Patent
LaCroix

(10) Patent No.: US 9,568,146 B1
(45) Date of Patent: Feb. 14, 2017

(54) PRESSURE RELIEF VALVE

(71) Applicant: Kelso Technologies Inc., Surrey (CA)

(72) Inventor: Barry LaCroix, Corunna (CA)

(73) Assignee: Kelso Technologies Inc., Surrey, B.C. (CA)

( * ) Notice: Subject to any disclaimer, the term of this patent is extended or adjusted under 35 U.S.C. 154(b) by 0 days.

(21) Appl. No.: 14/846,917

(22) Filed: Sep. 7, 2015

Related U.S. Application Data

(63) Continuation of application No. 13/998,078, filed on Sep. 28, 2013, now Pat. No. 9,163,738.

(51) Int. Cl.
  *F16M 13/02* (2006.01)
  *F16K 17/04* (2006.01)
  *F16K 24/04* (2006.01)

(52) U.S. Cl.
  CPC .............. *F16M 13/02* (2013.01); *F16K 17/04* (2013.01); *F16K 24/04* (2013.01)

(58) Field of Classification Search
  CPC ........ F16M 13/02; F16K 17/044; F16K 24/04; F16K 14/04; Y10T 137/7922
  See application file for complete search history.

(56) References Cited

U.S. PATENT DOCUMENTS

| 711,792 | A | * | 10/1902 | Smith | ................. | F16K 17/0413 |
| | | | | | | 137/535 |
| 2,293,956 | A | * | 8/1942 | Walthers | ............... | F16K 15/033 |
| | | | | | | 137/518 |
| 3,767,460 | A | * | 10/1973 | Kennel | .................... | B60V 1/16 |
| | | | | | | 428/446 |
| 3,974,850 | A | * | 8/1976 | Pierson | ................... | F16K 17/19 |
| | | | | | | 137/493.9 |
| 5,855,225 | A | * | 1/1999 | Williams, III | .......... | F16K 15/06 |
| | | | | | | 137/529 |
| 6,422,530 | B1 | * | 7/2002 | Williams, III | ...... | F15B 15/1476 |
| | | | | | | 251/27 |
| 2002/0185234 | A1 | * | 12/2002 | Matechuk | .......... | B65H 35/0033 |
| | | | | | | 156/577 |
| 2012/0131810 | A1 | * | 5/2012 | Hunsberger | ......... | G01B 3/1005 |
| | | | | | | 33/767 |
| 2012/0216885 | A1 | * | 8/2012 | Williams, III | .......... | F16K 15/00 |
| | | | | | | 137/535 |

* cited by examiner

*Primary Examiner* — Craig Schneider
*Assistant Examiner* — Frederick D Soski
(74) *Attorney, Agent, or Firm* — Adrienne B. Naumann

(57) ABSTRACT

Described herein is an improved externally mounted pressure relief valve that is especially adapted for rail tank cars or other large closed containers that contain or transport fluids, including liquids and gases. The pressure relief valve comprises a plurality of spring assemblies, and each spring assembly contains a pre-determined number of spring leaves. Each spring assembly is coiled upon a corresponding spring drum, and each spring drum is penetrated by a corresponding spring drum bolt. The spring assemblies are preferably aligned in at least two horizontal planes that are parallel to each other and normal to the vertical length of a spring block. The spring block and sealing disk are mounted vertically over the valve seat and within the confines of vertically extending spring brackets.

9 Claims, 18 Drawing Sheets

Top View

Front View

Right side view

Bottom View

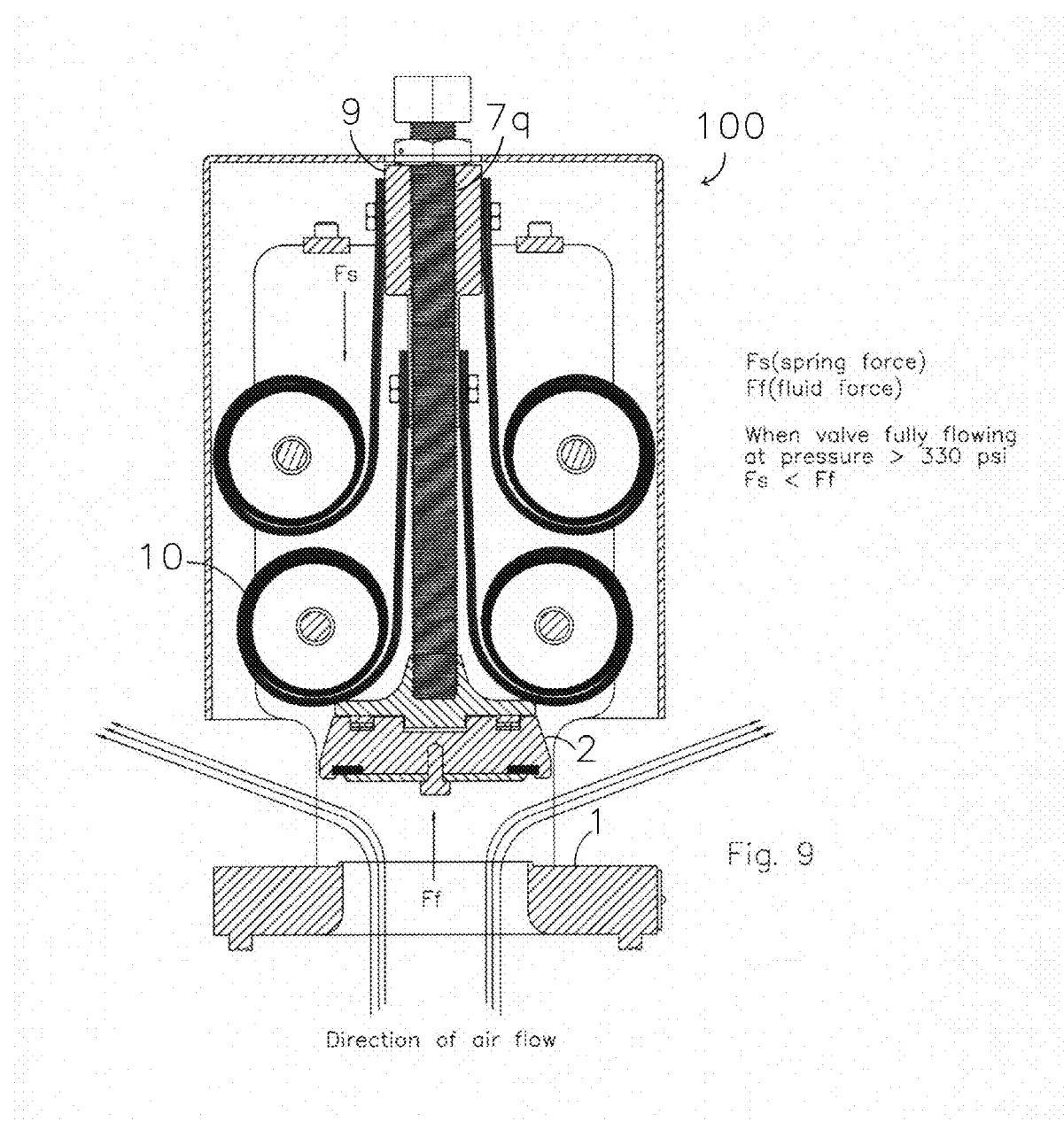

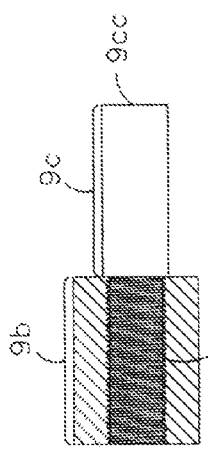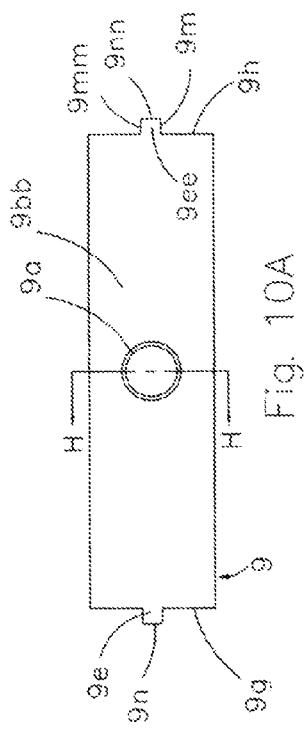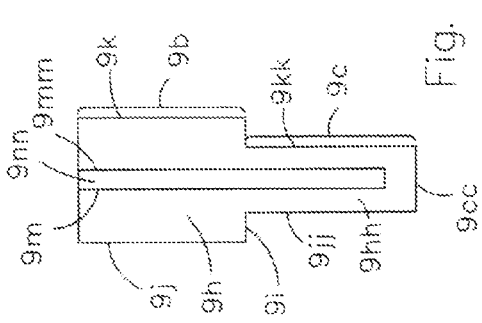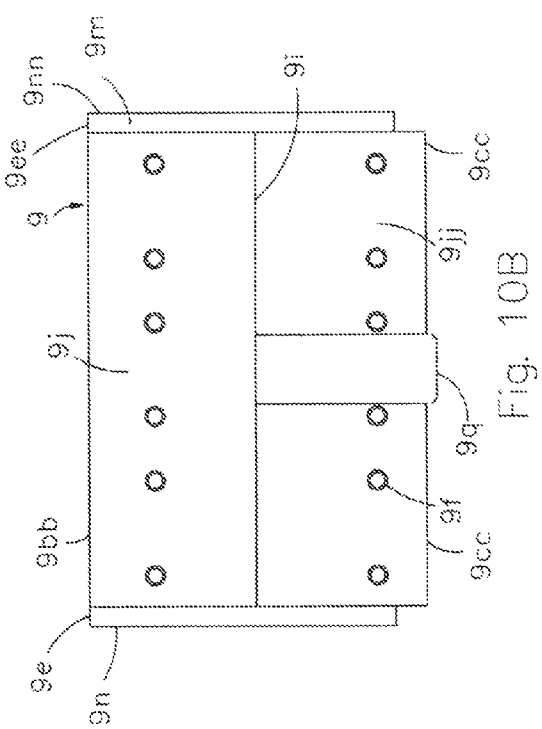

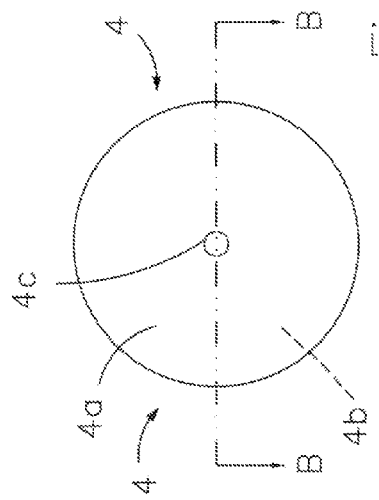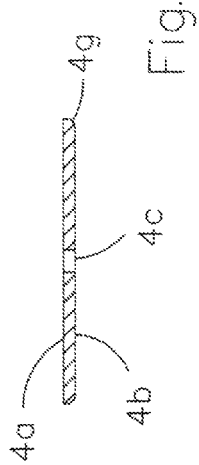
Fig. 11D
Fig. 11E
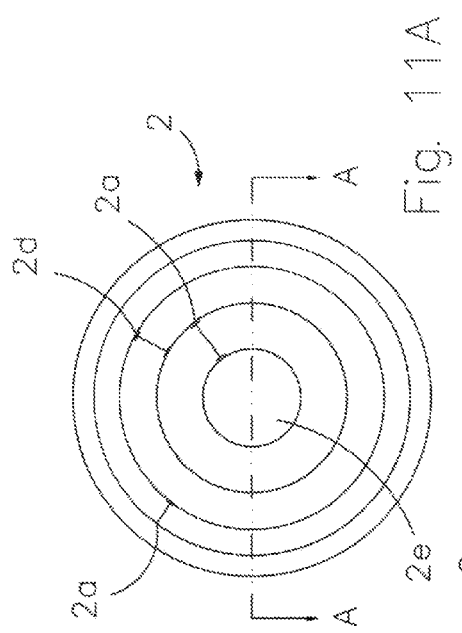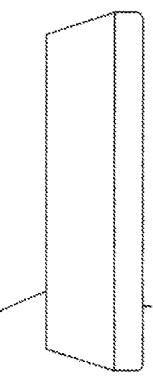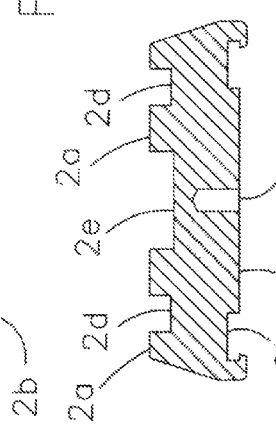
Fig. 11A
Fig. 11B
Fig. 11C

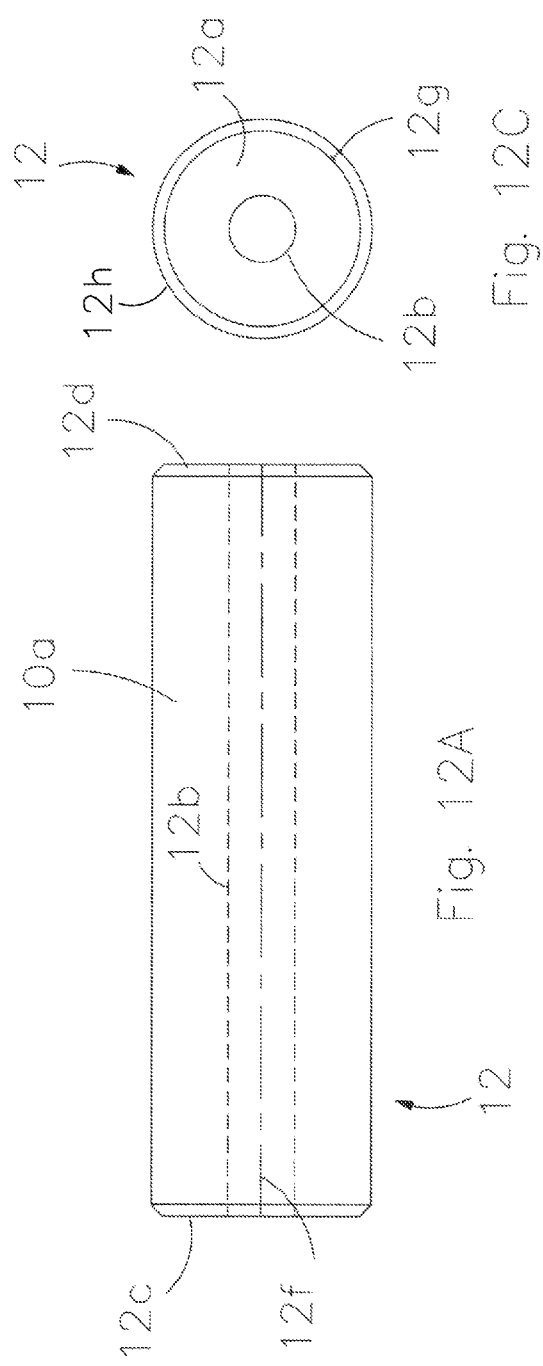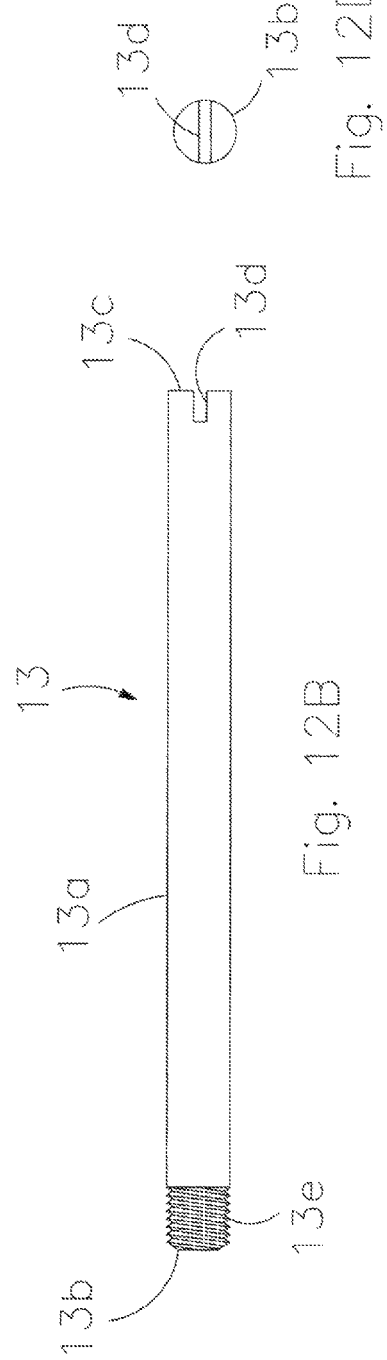

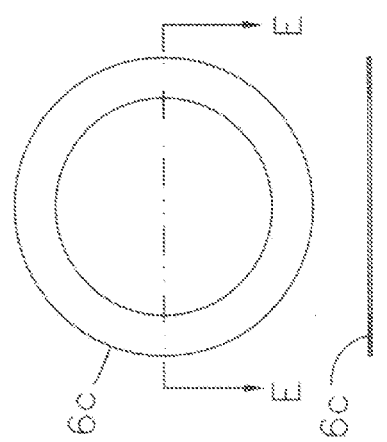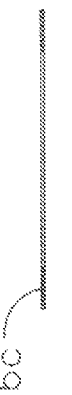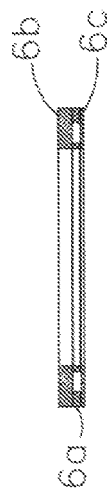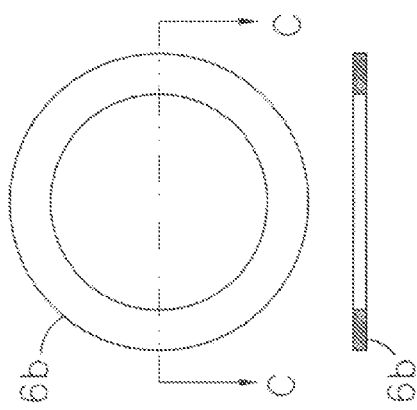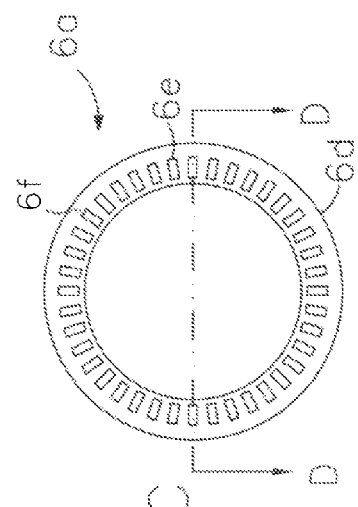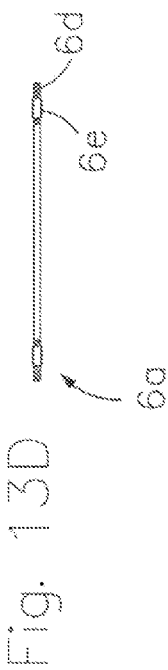

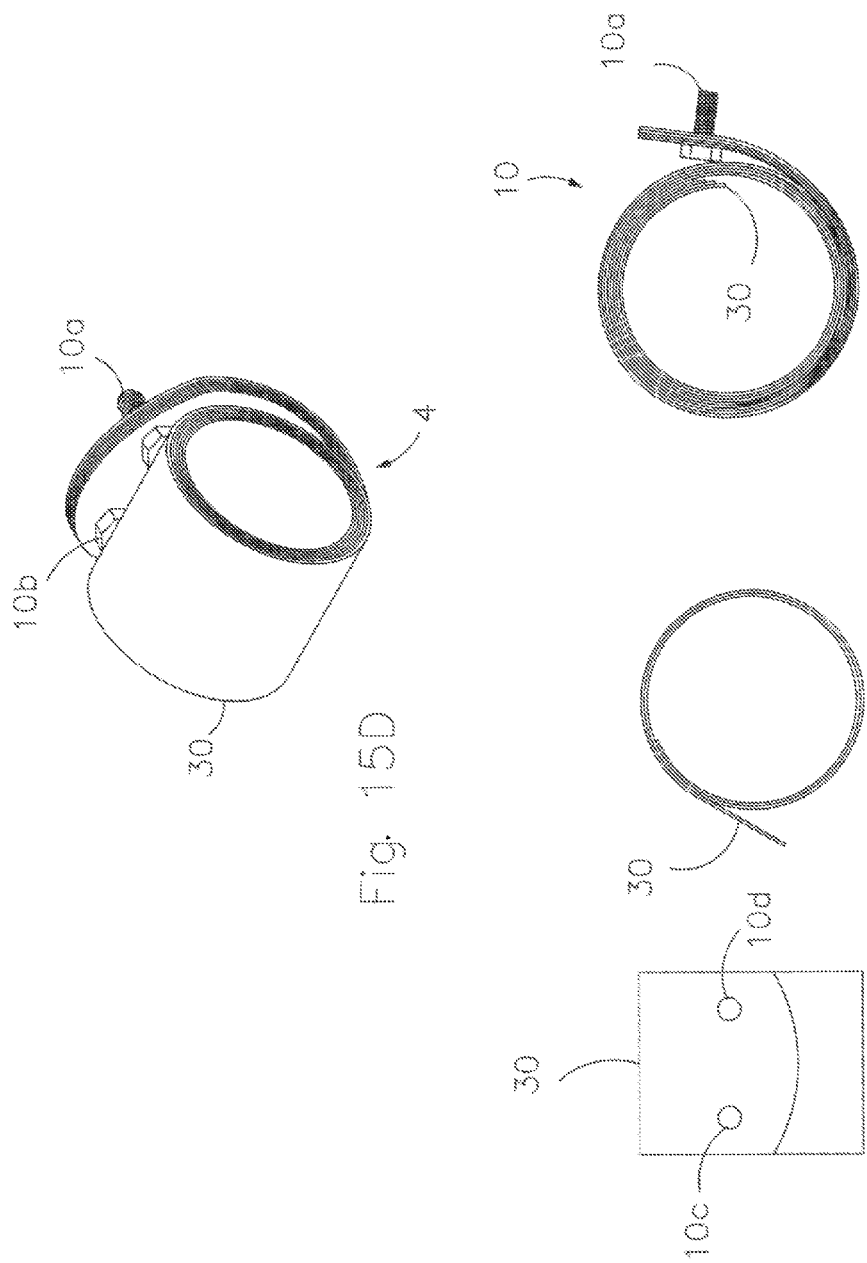

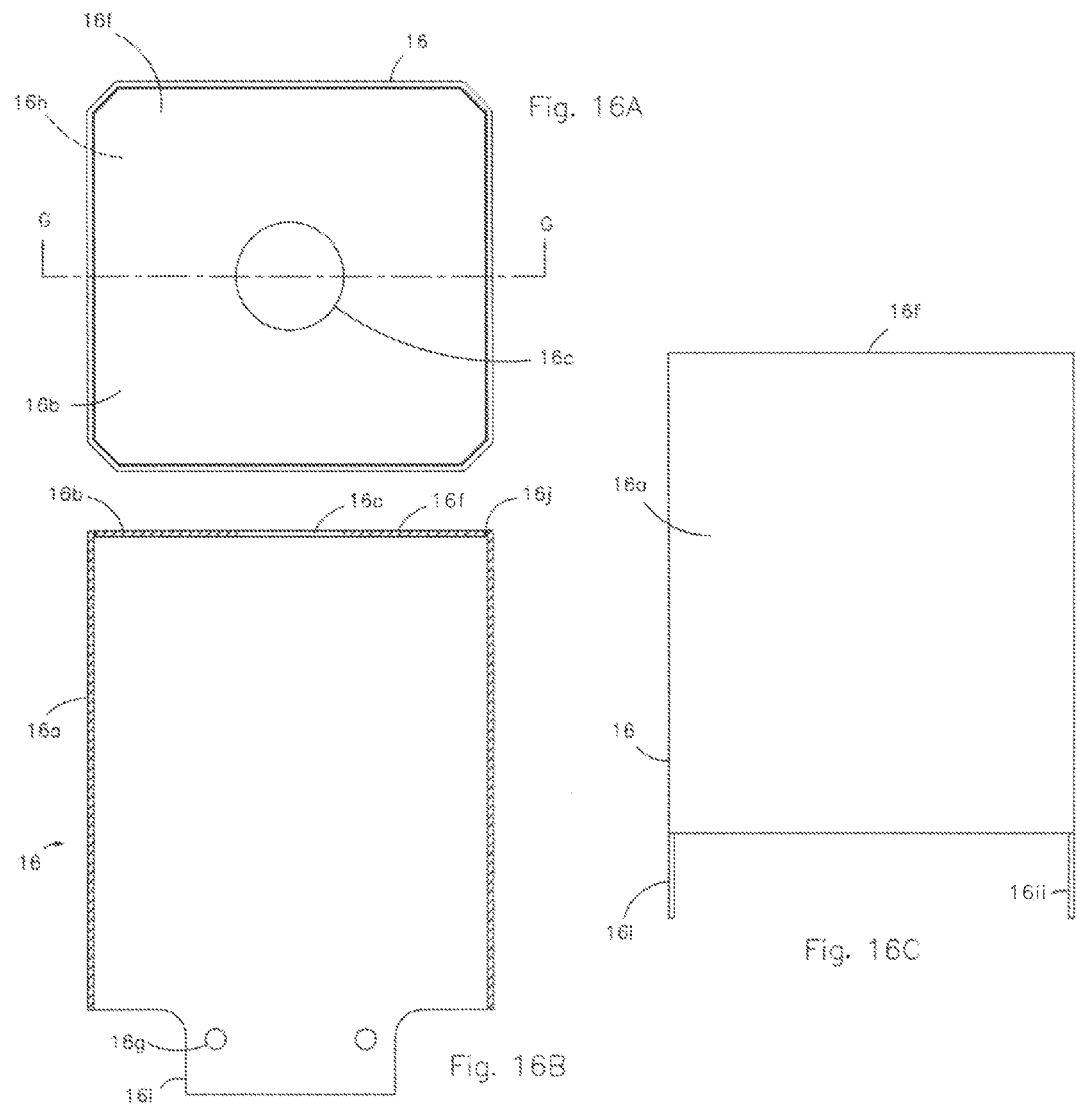

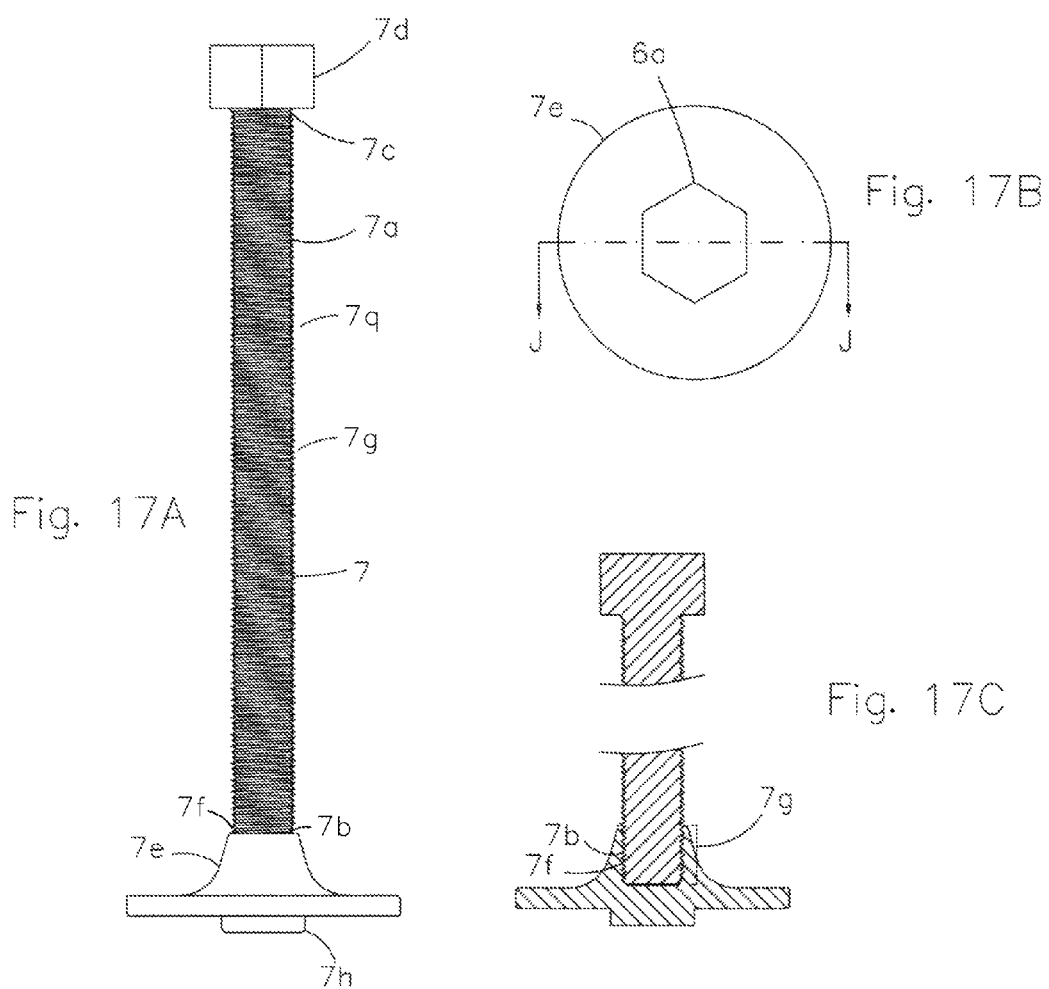

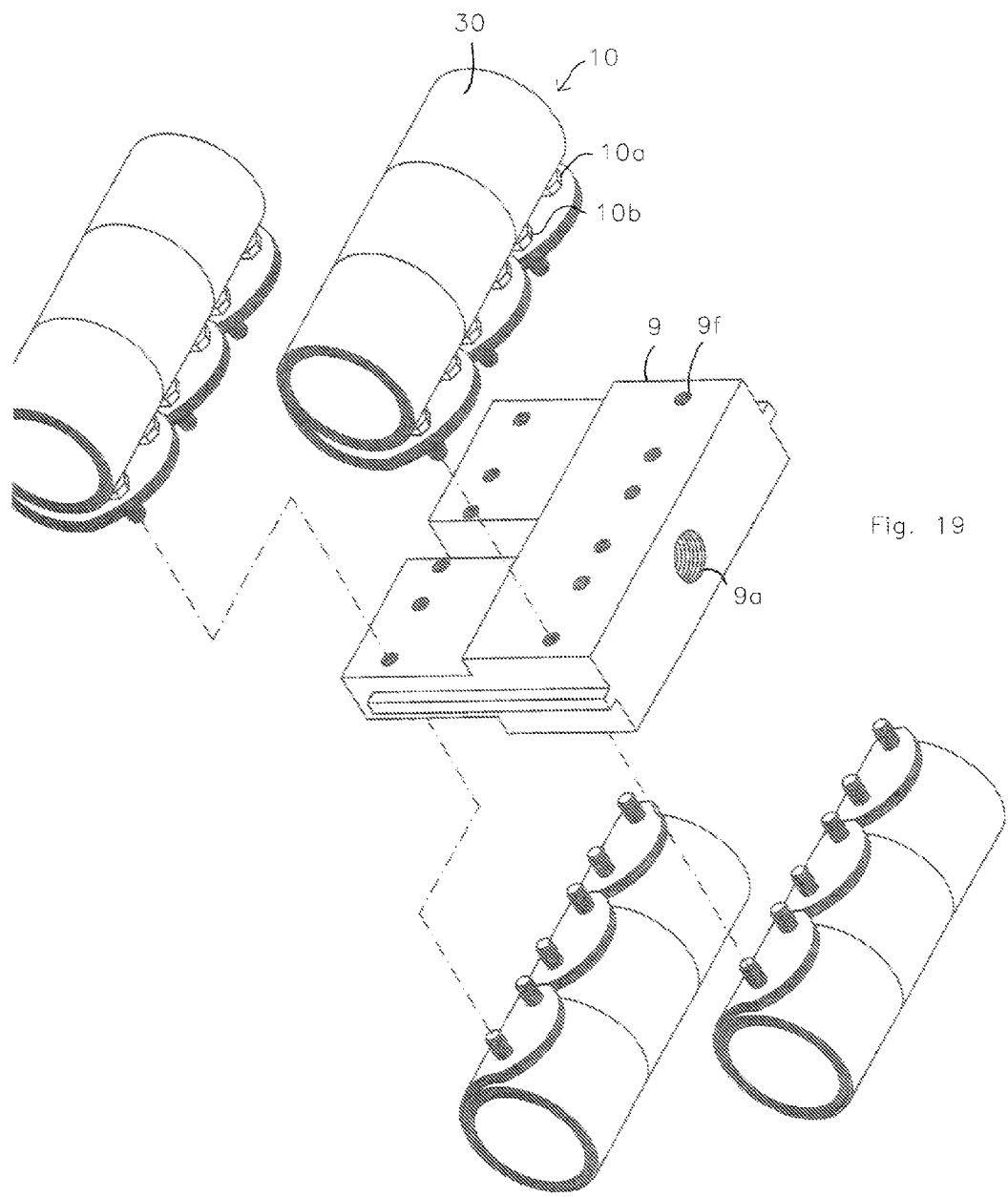

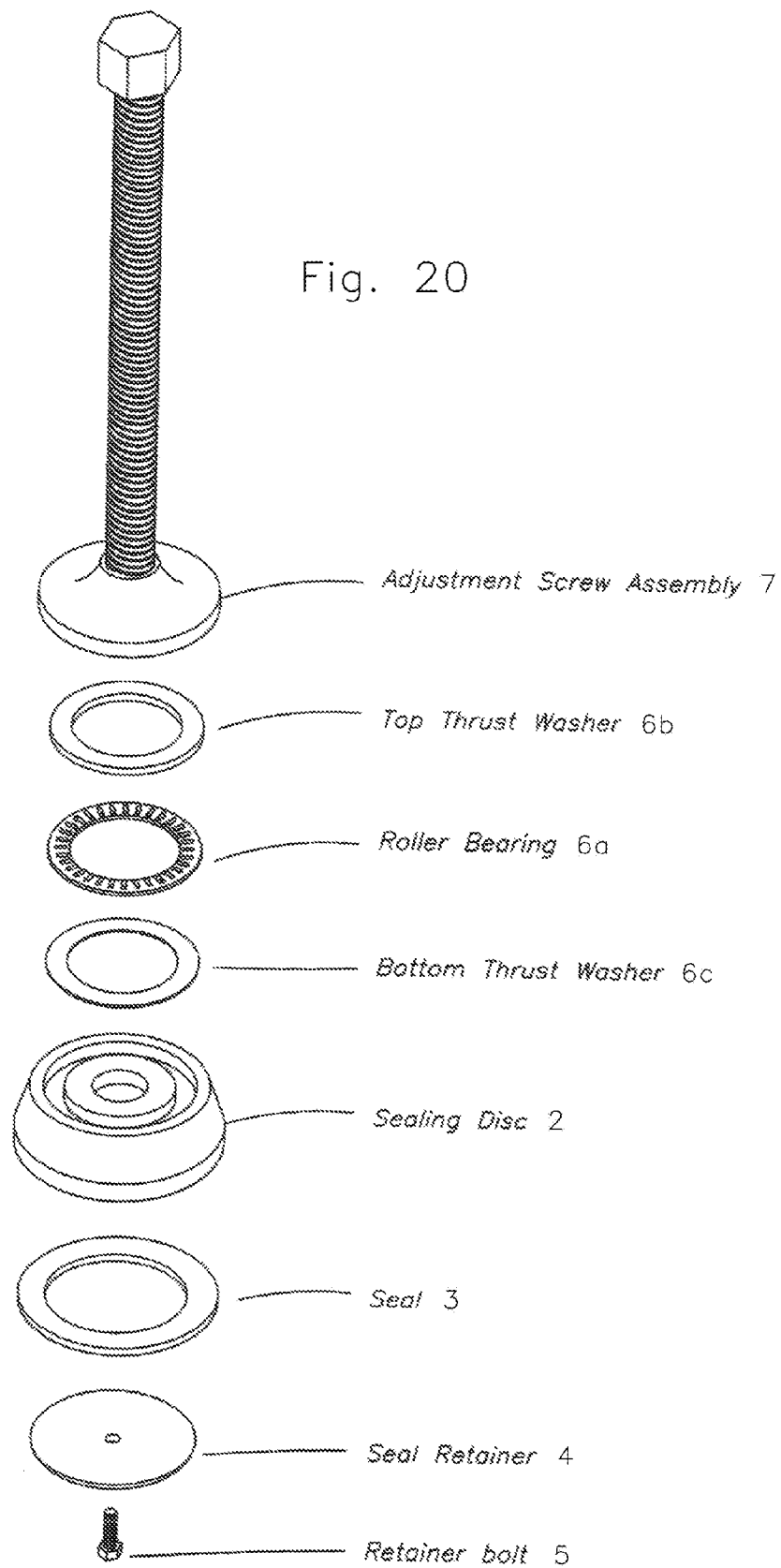

PRESSURE RELIEF VALVE

BACKGROUND OF THE INVENTION

The present invention relates generally to pressure relief valves, and more particularly to a pressure relief valve for venting expanding fluids contained in large closed containers. More particularly the present invention relates to a pressure relief valve for venting expanding fluids contained in trucks and rail way tank cars. Railroad tank cars that transport fluids generally comprise two categories: low pressure (general purpose) tanks and pressure tanks. The present invention most particularly addresses pressure tanks which require pressure relief valves. The primary purpose of the pressure relief valve is to vent fluids within the tank and thereby prevent or delay tank failure from increasing internal pressure. In addition, the pressure relief valve should alert persons to evacuate rapidly in the immediate vicinity of a dangerous pressure increase.

A pressure relief valve for a railroad tank car can be internal or external. With internal pressure relief valves the majority of valve components, including springs, are positioned within the tank. Therefore, these components are continuously exposed to the fluid being transported. External pressure relief valves are positioned upon on the exterior tank surface and consequently fewer components are exposed to the transported fluid. The current invention exclusively comprises external pressure relief valves. Unfortunately, in the past high flow rats in the range of 35.0000 through 45,000 standard cubic feet per minute were not achieved with external pressure relief valves. The problem to overcome was the fact that traditional pressure relief valves comprise helical compression springs that are prohibitively large for high valve flow rates. In particular, government regulations require that valves comprise a protective housing with a maximum height of approximately thirteen inches. However, a comparable helical spring valve with the same potential spring force as the current invention must be at least seventeen inches in height.

Certain liquids and gases transported in railway tank cars or tank trucks are particularly hazardous and at elevated temperatures. These gases and liquids may expand within the tank and increase the internal pressure within the closed container or tank to a dangerous level. Consequently, government regulatory agencies require operators of these vehicles to install safety pressure relief valves. These pressure relief valves are initially calibrated to automatically open above a pre-set pressure level and thereafter vent the liquid or gas at a specified discharge rate.

Current existing pressure relief valves are generally biased to a closed pre-vent position, such as by a coil spring or a constant-force spring. Helical coil spring valves generally require the internal pressure within the tank to continue to increase beyond the initial valve opening pressure as a condition to achieving the pre-set maximum valve venting capacity. On the other hand, constant-force spring valves have the advantage of (i) opening to a maximum venting capacity instantly at the pre-set opening pressure and (ii) constant-force spring valves do not require the internal pressure within the tank to increase to achieve the pre-se opening pressure.

To overcome this problem the current invention utilizes vertically aligned constant force spring assemblies made of numerous leaf springs. The stacked configuration is an improvement that results in a valve with smaller dimensions. Stacking also allows a substantially increased spring force compared with existing pressure relief valves. The spring assemblies attach to a singe spring block with spring bolts and results in an increase flow of fluid within this smaller confined area.

Unfortunately, size, complexity and cost of the constant-force spring valve required for this particular closed tank application have prevented their general acceptance in the industry. Space restrictions along the tank or other closed container, as well as design constraints originally limited the number of constant force springs to offset this space and design restriction. U.S. Pat. No. 5,855,225 (Williams III) solved this problem with four constant force springs. In Williams, each constant force spring comprised rolled leaf springs positioned along the same horizontal plane within the valve.

To further overcome the above problems, in the current invention spring assemblies containing leaf springs are now (i) vertically aligned along two horizontal planes and (ii) attached to a structure known as the spring block. This vertical alignment of the spring assemblies attach to a spring block by spring bolts, and this alignment also improve the performance of the entire valve.

The current invention also preferably includes a bearing assembly positioned between the adjustment screw and the sealing disc, and therefore less torque to required rotating the adjustment screw. The bearing assembly also reduces the friction between the adjustment screw and disc, and thereby eliminates the requirement for constant lubrication of the contact area between these two components. The spring bracket also provides a more rigid guide for vertical movement of the spring block during valve operation. The spring bracket also attaches to a spring bracket brace and thereby further improves the performance of the pressure relief valve.

The current invention also provides a roller bearing assembly to reduce friction and wear between rotating and contacting valve components. For example, U.S. Pat. No. 5,855,225 (Williams) discloses two contacting surfaces between the adjustment screw and seal disc that rely upon lubrication to prevent friction. However, with the increased spring assembly force capacity of the current invention, corresponding increased wear and friction would (i) damage these surfaces and (ii) result in a prohibitively high torque requirement to rotate the valve's adjustment screw. Fortunately, this new roller bearing assembly prevents this wear, friction and constant lubrication task for higher valve forces.

SUMMARY OF THE INVENTION

Described herein is a pressure relief valve with a valve body with a valve seat that surrounds an aperture within the upper surface of a tank or other container. The valve cover is a square tubular component and protects the valve components within its confines. The valve cover also prevents access to, and tampering, with valve components. The cover bolts (i) attach the valve cover rigidly to spring brackets and (ii) are preferably made of zinc coated carbon steel.

The new pressure relief valve also comprises a valve body with a preferably circular valve aperture. This circular valve aperture is continuous with a tank opening within the tank upper surface so there is a continuous channel for venting fluid whenever the valve is properly attached to the tank upper surface. There is a preferably circular valve disk that rests upon and seals the single valve vent opening and vertically aligned tank opening when the tank pressure does not exceed a specific preset valve pressure. The sealing disk normally rests upon the continuous exterior edge of the valve seat in a sealed manner by forces from several staggered constant-force spring assemblies. For a sealing fit to the vale body there is also a retaining disk and elastomeric device such as an O-ring or gasket. The retaining disk preferably is located between the valve seat and sealing disk within a circular groove on the lower surface of the sealing disk.

In its default position preferably a single seal retainer is positioned within the recessed groove of the lower surface of the sealing disk resting upon the valve seat. The seal retainer preferably made of 304 or 316SS stainless steel the sealing disk (i) is compressed by force of the spring assemblies in its closed sealed position upon the valve seat until (ii) tank pressure exceeds the opposing force of these spring assemblies. The sealing disk is lifted from the valve seat if and when the internal tank pressure exceeds the pre-set pressure of the pressure relief valve. The number of leaf springs, and the restoring force of each leaf spring are pre-selected and pre-calibrated to meet the required valve opening pressure.

For example, to achieve a set pressure of 330 psi (pounds per square inch) a spring force of 2379 foot pounds is necessary, and each spring assembly provides at least 231 foot-pounds of such force in the current invention. At this pressure the spring force exceeds the fluid force at the set pressure so adjustment for setting the valve is possible. However, when fully flowing the fluid through the valve increases as the valve opens and pressure rises. Consequently additional spring force, as provided by the current invention, is necessary to overcome the fluid's momentum and close the valve.

Each spring assembly preferably attaches to a component known as a spring block with two cap screws. Each spring assembly comprises a plurality of leaf springs and these leaf springs are (i) coiled along a preferably cylindrical spring drum which (ii) in turn is traversed by a cylindrical spring bolt along the drum centrally aligned longitudinal axis. The cylindrical spring drum is supported at its opposing ends within corresponding vertical angle brackets positioned along the bottom of the valve body. Each spring assembly can reversibly coil and uncoil along its corresponding spring drum.

Each pressure relief valve comprises a plurality of spring assemblies and each spring assembly comprises a plurality of spring leaves. Most preferably each spring assembly preferably comprises (i) seven spring leaves and (ii) two cap screws. Each pressure relief valve preferably comprises twelve such spring assemblies. The spring leaves provide a resisting force through the spring block, adjustment screw, sealing disc and valve seat to oppose the force of the tank's internal pressure from expanding fluids. Each spring assembly is attached rigidly to the spring block by the cap screws, but each spring assembly can rotate along a corresponding cylindrical drum and drum bolt independently of the other spring assemblies.

The spring brackets of the pressure relief valve (i) are preferably A36 or 304 SS steel (ii) attach to the valve flange by welding to (iii) provide a rigid guide for vertical movement of the spring block, to provide a structure for the cover attachment, and to provide a stable rotational axis for the spring drums and spring assemblies. There is also an appended sealing disc that is located between the adjustment screw and the valve body. The valve seal is preferably made from an elastomeric material or a flouroelastomer. The valve seal provides a tight interface between the valve body seat and the sealing disc to prevent leakage the sealing disk is in its default position, i.e., when the internal pressure of the tank is less than the force exerted by the pre-calibrated spring assemblies.

The valve spring bolt is made of 301 stainless steel and includes two cap screws made of 18-8 stainless steel. The spring bolt retains the spring assemblies rigidly to the spring block. Each cylindrical spring drum is made of smooth solid nylon and thereby provides a round almost frictionless surface between each spring assembly and corresponding drum bolt. The drum bolt is a machined rod that is preferably primarily made of (i) A36 carbon steel or (ii) 304SS stainless steel. Each drum bolt is threaded into a corresponding spring bracket, and thereby each drum bolt thereby provides a rotating surface around which each corresponding spring assembly can reversibly coil.

Pressure relief valve of the present invention also contains a (i) seal retainer bolt and (ii) a bearing assembly. The bearing assembly contains a needle roller bearing as well as a top thrust washer and a bottom thrust washer, and all three components preferably made of hardened steel. The bearing assembly provides a rotational interface between the sealing disc and the adjustment screws and is a new feature of the invention.

The spring block is preferably an A36 carbon steel or 304SS stainless steel component with (i) a centrally positioned threaded bore for the cylindrical screw engagement infra and (ii) threaded apertures for attachment of spring assemblies containing spring leaves. The spring bock moves vertically between spring brackets during (i) pre-setting of the valve release pressure and (ii) changes in the internal pressure of the tank contents. The pressure relief valve also includes the single preferably cylindrical adjustment screw which comprises a (i) threaded rod (ii) wrenching element and (iii) lower disk. The adjustment screw is preferably (i) made of 304 SS stainless steel or A36 carbon steel and (ii) provides the rotating interface between the spring block and the sealing disc. A jam nut preferably made of 304SS stainless steel or A36 carbon steel locks the adjustment screw at the appropriate vertical point to preset the tension from the spring assemblies.

The current invention also includes first and second spring bracket braces and each brace is preferably made of A36 carbon steel or 304 SS stainless steel. The spring bracket brace preferably comprises a longitudinal bar which is (i) rectangular in cross-section and (ii) contains a single aperture within each opposing end.

The spring bracket brace retains the spring brackets in a parallel position to eliminate binding of the spring block as it rises vertically during the initial valve presetting and during instances when the disc rises from the pressure within the tank or other large closed container. The brace bolt is a socket head cap screw that is preferably made of stainless steel. If there is excessive clearance between the spring block and the spring brackets, the lock and springs may rotate and create friction at the opposing contacting surfaces, and thereby prevent the vertical movement of the spring block.

The brace bolt retains the spring racket brace rigidly to the spring bracket. The spring brackets are preferably made of A36 steel or 304 SS steel and attach to the valve flange by welding. Spring brackets provide a rigid vertical guide for the vertical movement of the spring block. The spring brackets also attach to the valve cover and thereby provide stable rotational axis for the spring drums and spring assemblies. If there is an excessive clearance between the spring block and the spring brackets, then the spring block and spring brackets may (i) rotate and create friction at their respective contacting surfaces and (ii) thereby prevent the spring block's vertical movement.

Accordingly, it is an object of the present invention to provide a constant-force spring pressure relief valve suitable for use in tank cars, tank trucks and similar containers which release fluids above a precise preset pressure.

Another object is to provide a constant-force spring pressure relief valve that is reliable, compact and relatively simple in construction and operation.

Still another object is to provide a constant-force spring pressure relief valve in which the valve disc remains in vertical alignment with the valve seat for maintaining positive shutoff, and prevention of venting of fluids within the tank below a preset pressure.

A further object of the invention is to provide a pressure relief valve that is precisely pre-set for venting a container above a predetermined initial pressure.

These and other objects and advantages of the invention will become apparent from the attached illustrations and detailed description of the invention that follows.

BRIEF DESCRIPTION OF THE DRAWINGS

FIG. 9 illustrates a lateral cutaway view of the pressure relief valve of FIG. 1 when the internal tank pressure exceeds the opposing force of the spring assemblies.

FIG. 10A illustrates a close up isolated top plan view of the spring block for the pressure relief valve of FIG. 1.

FIG. 10B illustrates a lateral view of the spring block for the pressure relief valve of FIG. 1.

FIG. 10C illustrates n isolated view along line H-H of the spring block with bore for the adjustment screw in the preferred embodiment of FIG. 1.

FIG. 10D illustrates a closeup right lateral view of FIG. 10B.

FIG. 11A illustrates a close up isolated top plan view of the sealing disk for the pressure relief valve of FIG. 1.

FIG. 11B illustrates a closeup isolated partial anterior view of the sealing disk for the pressure relief valve of FIG. 1.

FIG. 11C illustrates the sealing disk of the pressure relief valve of FIG. 1 through line A-A of FIG. 11A.

FIG. 11D illustrates a close up isolated top plan view of the seal retainer for the pressure relief valve of FIG. 1.

FIG. 11E illustrates the seal retainer for the pressure relief valve of FIG. 1 through line BB of FIG. 11D.

FIG. 12A illustrates a close-up isolated anterior view of the spring drum for the pressure relief valve of FIG. 1.

FIG. 12B illustrates a close up isolated anterior view of the drum bolt for the pressure relief valve of FIG. 1.

FIG. 12C illustrates the proximal end of the drum bolt for the pressure relief valve of FIG. 1.

FIG. 12D illustrates the distal end of the drum bolt for the pressure relief valve of FIG. 1.

FIG. 13A illustrates a close up isolated top plan view of the uppermost thrush washer for the bearing assembly in the preferred embodiment.

FIG. 13B illustrates a top thrust washer for the bearing assembly in the preferred embodiment along line C-C of FIG. 13A.

FIG. 13C illustrates a closeup isolated top plan view of the needle bearing for the bearing assembly in the preferred embodiment.

FIG. 13D illustrates an isolated needle bearing along line D-D of FIG. 13C.

FIG. 13E illustrates a close-up isolated top plan view of the bottom thrust washer for the bearing assembly of the pressure relief valve of FIG. 1.

FIG. 13F illustrates a close up isolated view of the bottom thrust washer along line F-F of FIG. 13E.

FIG. 13G illustrates a close-up isolated sectional view of the bearing assembly for the pressure relief vale of FIG. 1.

FIG. 15A illustrates a close up isolated anterior view of apertures for connecting a spring block to a spring assembly.

FIG. 15B illustrates a close up lateral view of single spring leaf for the pressure relief valve of FIG. 1.

FIG. 15C illustrates a close-up isolated lateral view of a multi-leaf spring assembly for the pressure relief valve of FIG. 1.

FIG. 15D illustrates an isometric view of the spring assembly in FIG. 15C.

FIG. 16A illustrates a close up isolated top plan view of the cover for the pressure relief valve of FIG. 1.

FIG. 16B illustrates the domelike cover for the pressure relief valve of FIG. 1 along line G-G of FIG. 16A.

FIG. 16C illustrates a close up isolated lateral view of the domelike cover for the pressure relief valve of FIG. 1.

FIG. 17A illustrates a close up isolated anterior view of the adjustment screw for the pressure relief valve of FIG. 1.

FIG. 17B illustrates a close up isolated top plan view of the wrenching element for the adjustment screw of FIG. 17A.

FIG. 17C illustrates an adjustment screw along line J-J of FIG. 17B.

FIG. 19 illustrates an isolated exploded view of a spring block with attaching spring assemblies for the pressure relief valve of FIG. 1.

FIG. 20 illustrates an isolated exploded view of the adjustment screw and bearing assembly for the pressure relief valve of FIG. 1.

DESCRIPTION OF THE PREFERRED EMBODIMENT AND OTHER EMBODIMENTS

Figure 1:
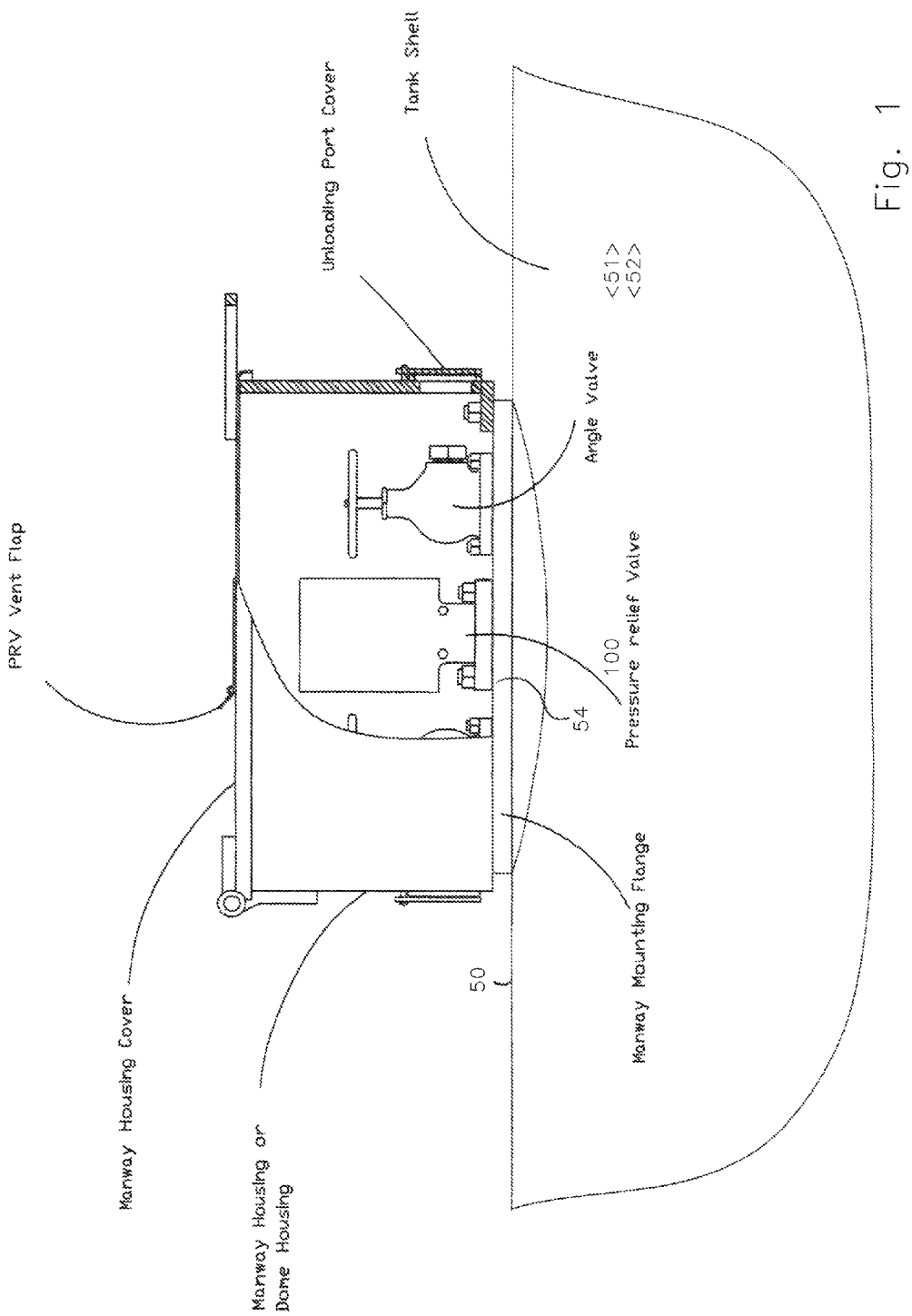
FIG. 1 illustrates the preferred embodiment of the pressure relief valve attached to the upper surface of a rail tank car.
Figure 2:
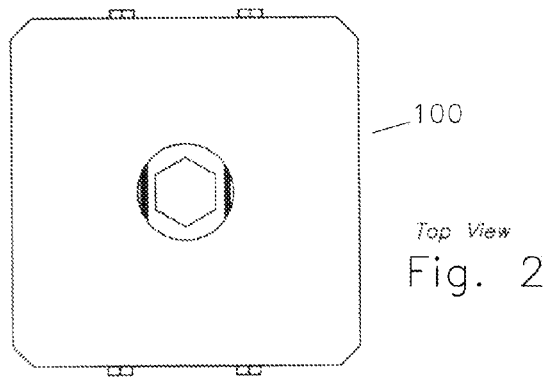
FIG. 2 illustrates an upper plan view of the pressure relief valve of FIG. 1.
Figure 4A:
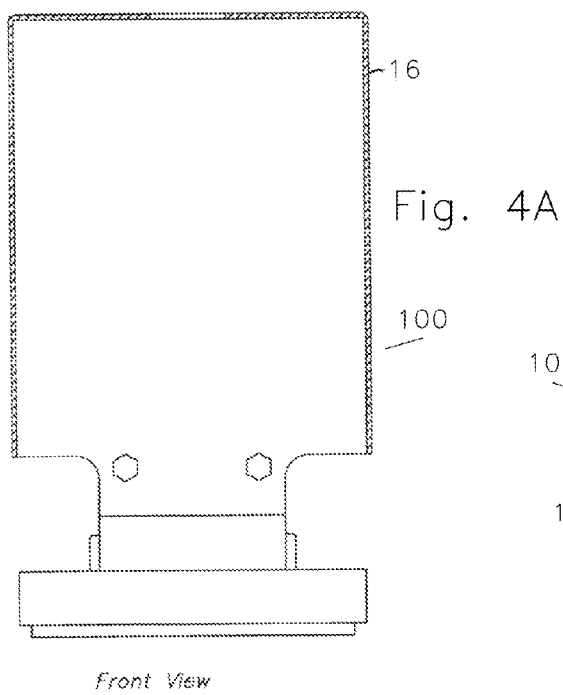
FIG. 4A illustrates an anterior view of the pressure relief valve of FIG. 1.
Figure 3:
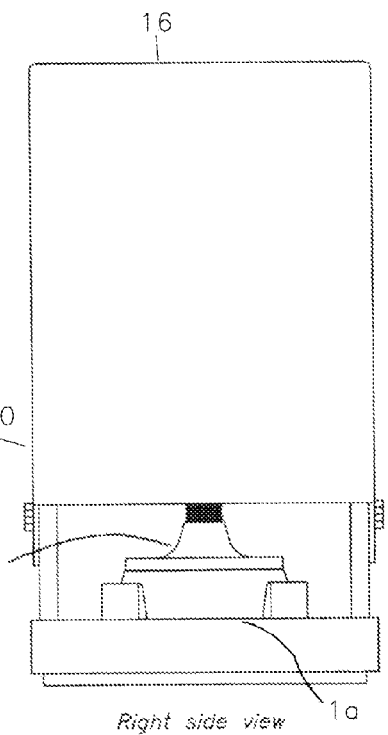
FIG. 3 illustrates a lateral view of the fully assembled pressure relief valve of FIG. 1.
Figure 5:
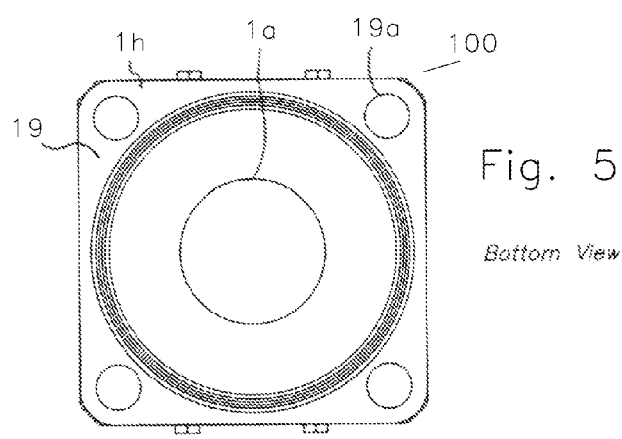
FIG. 5 illustrates a bottom plan view of the pressure relief valve of FIG. 1.
Figure 4:
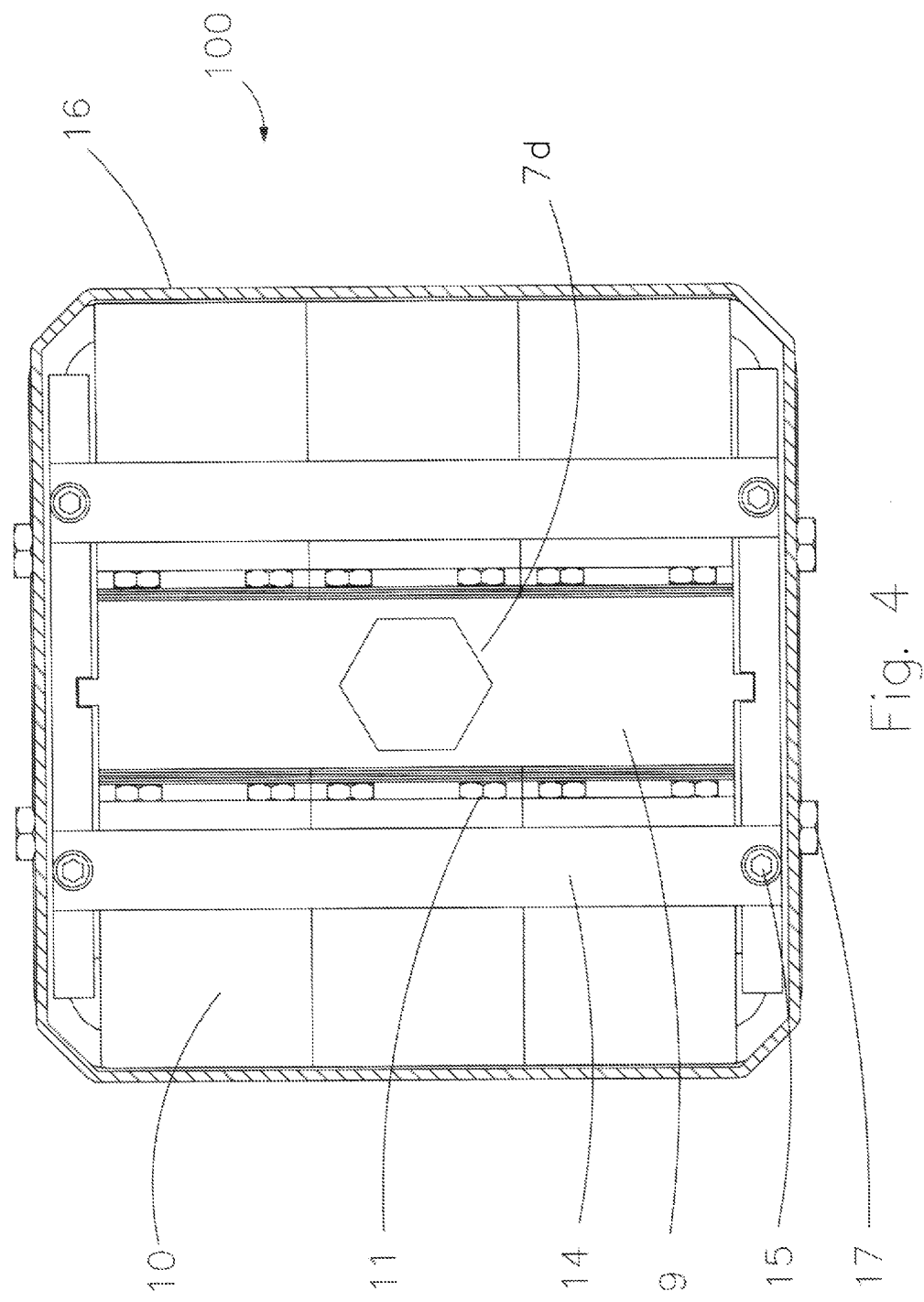
FIG. 4 illustrates an upper plan view of the pressure relief valve of FIG. 1 with the domelike cover removed.

I. Structure and Materials of the Preferred Embodiment and Other Embodiments Referring to FIGS. 1, 2, 4, and 5 in the preferred embodiment pressure relief valve assembly 100 is mounted upon the upper surface 50 of a fluid storage container 51 or rail car transport tank 52. Pressure relief valve assembly 100 includes a preferably circular valve body 1 that circumscribes a single preferably circular valve aperture 1a. Circular valve aperture 1a is continuous with tank car or container opening 54 whenever pressure relief valve 100 is properly attached to tank car or container upper surface 50. Circular valve aperture 1a is preferably positioned within bottom floor 1c of valve body 1 and bottom floor 1c forms valve seat 1d. Valve bottom flange 19 is preferably made of A516 Grade 70 carbon steel or 316L SS stainless steel.

Figure 6:
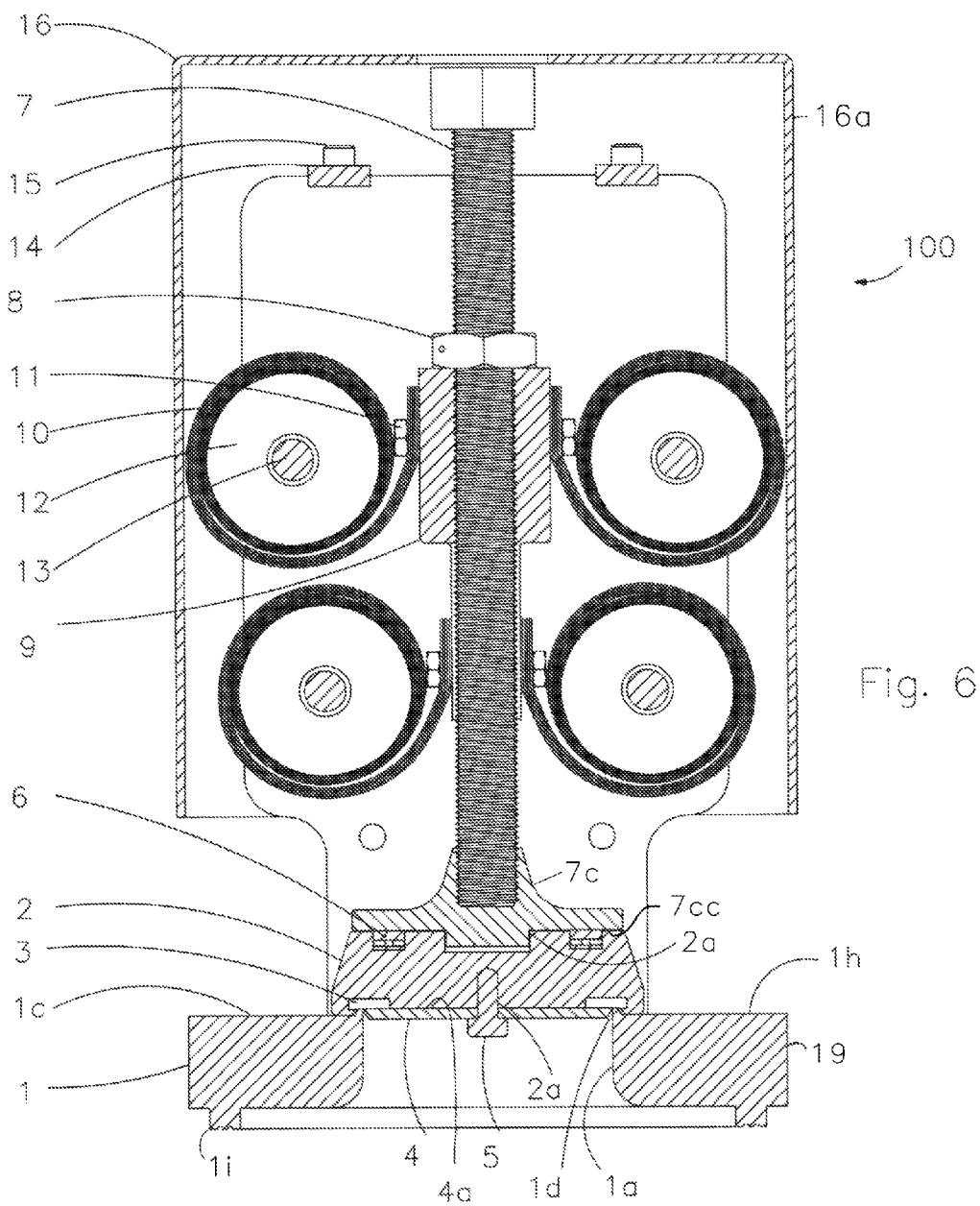
FIG. 6 illustrates a lateral cutaway view of the fully assembled pressure relief valve of FIG. 1.
Figure 7:
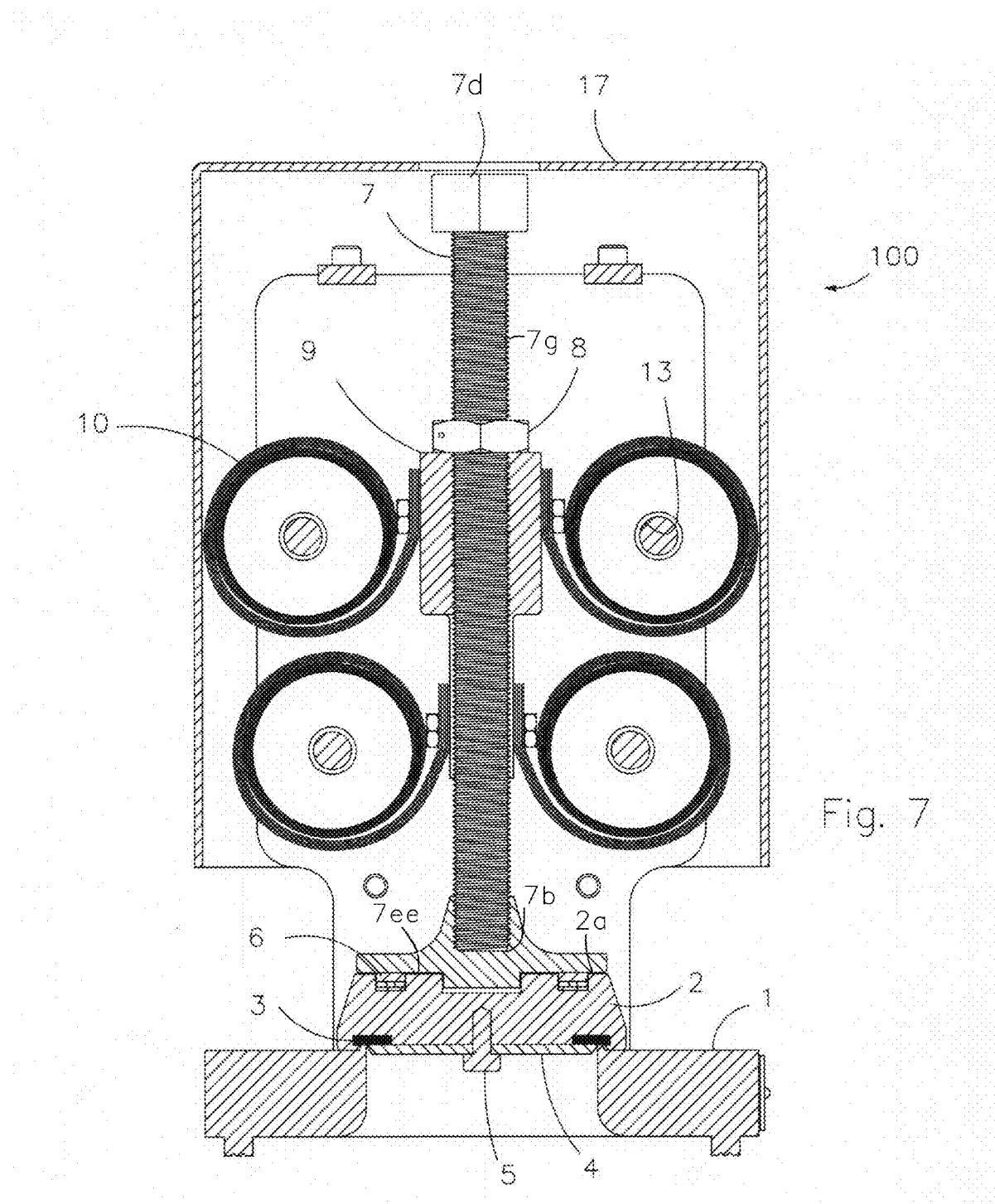
FIG. 7 illustrates a closeup lateral cutaway view of the pressure relief valve of FIG. 1 in a completely closed configuration.

Referring to FIG. 6, resting upon upper valve body surface 1c and circumscribing circular valve opening 1a is reversibly removable seal retainer disk 4. Seal retainer disk 4 is preferably (i) 2.992 inches in diameter (ii) 0.125" inch in thickness and (iii) made from 304 SS stainless steel. Seal retainer disk 4 is preferably (i) ring-like in shape (ii) 0.25 inches in inner diameter and (iii) 2.992 inches in exterior diameter. Seal retainer disk 4 provides additional mechanical retention between sealing disk 2 and valve aperture 1a. Seal retainer disk 4 also mechanically compresses sealing disc 2 by preferably 0.01 inch at seal mating surface 4a.

Still referring to FIG. 6, flexible seal 3 is preferably (i) a single O-ring or gasket (ii) 3.363 inches in outer diameter (ii) 0.125 inch in thickness and (iv) made of an elastomeric or flouroelastomer material. Flexible seal 3 provides a tight fitting leak-resistant connector between (i) valve body upper surface 1c (ii) sealing disc 2 infra and seal retainer disk 4. Seal retainer bolt 5 is preferably a ¼-20 inch by ½ inch large cap screw made of 304 SS stainless steel. Seal retainer bolt 5 threads through seal retainer central base 4c and into sealing disc 2 to compress and retain seal 3 within continuous circular groove 2h.

Referring to FIGS. 1 and 6, single sealing disk 2 (i) coaxially aligns with valve seat 1d and (ii) vertically aligns with tank aperture 54 whenever pressure relief valve 100 appropriately attaches to tank car 51 or other closed tank container 52. Sealing disk 2 is preferably (i) a continuous solid integral reversibly removable circular component (ii) 3.784 inches in diameter (iii) 1.02 inch in thickness and (iv) made of 304 SS stainless steel. Sealing disk 2 contains seal retainer 4 within sealing disk recessed lower surface 2b and (ii) roller bearing assembly 6 within sealing disk upper recessed surface 2a. Sealing disc 2 is positioned between adjustment screw 7 and valve body upper surface 1c.

As best seen in FIGS. 6 and 11C, disk upper surface 2a contains a continuous circular groove 2d into which bearing assembly 6 inserts in the preferred embodiment, see infra. Adjustment screw disk 7e preferably inserts into disk circular depression 2e within sealing disk upper surface 2a. Lower sealing disk surface 2b contains (i) circular retainer groove 2h for mechanical retention of seal 3 and (ii) disk bore 2f for insertion of seal retainer bolt 5 and retention of seal retainer 4.

Referring to FIGS. 6, 13A, 13B, 13C, 13D, 13E, 13F and 13G, bearing assembly 6 preferably includes (i) single needle roller bearing and gage 6a (ii) single top thrust washer 6b and (iii) single bottom thrust washer 6c. Needle roller bearing and gage 6a comprise (i) a circular ring shaped cage 6d with multiple radial slots 6f and (ii) each slot 6f houses a single needle roller bearing 6e. Bearing assembly 6 is positioned between (i) sealing disk upper surface 2a and (ii) screw disk lower surface 7ee where disk 7e preferably attaches to the proximal end 7b of adjustment screw 7 infra with epoxy adhesive. Bearing assembly 6 provides a smooth surface for rotation of sealing disc 2 and adjustment screw 7. Bearing assembly 6 also prevents excessive wear and friction on contacting surfaces of adjustment screw 7 and sealing disc 2 that results from the increased force from multiple spring assemblies 10 infra.

Referring to FIGS. 6, 7,17A, 17B and 17C, adjustment screw 7 extends vertically and rigidly upward from sealing disk 2. Adjustment screw 7 comprises a single threaded rod 7q that is preferably ¾-16 UNF by 9.44 inches in longitudinal length (Unified National Fine: thread outside diameter/threads per inch). Single threaded rod 7q also comprises a lower proximal rod end 7b and an upper distal rod end 7c. Adjustment screw 7 also preferably includes al ¾ inch by 1 and ⅛ inch hexed wrenching element 7d at upper distal rod end 7c. Adjustment screw 7 also preferably comprises a single adjustment screw disc 7e at proximal rod end 7b.

Screw disc 7e preferably comprises a single centrally located threaded aperture 7f through which threaded rod 7q inserts. Screw disc 7e is preferably also further attached to threaded rod 7q with an epoxy adhesive applied within threaded aperture 7f over rod longitudinal length 7g. Adjustment screw 7 is (i) preferably made of 304 SS stainless steel and (ii) provides a rotating surface between stationary spring block 9 infra and sealing disk 2. Screw disk 7e also comprises a circular lower extrusion 7h, and extrusion 7h functions to prevent lateral movement within sealing disc circular depression 2e (FIG. 11C). Adjustment screw 7 transfers deflected spring assembly force to seal disk 2 and valve seat 1d. As best seen in FIG. 6, positioned upon and engaging singled threaded rod 7q is circular threaded rod jam nut 8. Rod jam nut 8 is preferably ¾-16 and is made of stainless steel or carbon steel. Jam nut 8 locks adjustment screw 7 in place after pressure relief valve 100 (i) is pre-calibrated to the appropriate internal tank pressure (ii) by applying the appropriate torque to spring block upper surface 9a infra.

Referring to FIGS. 6, 10A, 10B, 10C and 10D, adjustment screw 7 traverses spring block 9 through central vertical threaded longitudinal bore 9a. Spring block 9 is an integral solid polyhedral component that preferably further comprises (i) a larger upper segment 9b that is rectangular in cross—section and (ii) a smaller lower segment 9c that is also preferably rectangular in cross-section. Central vertical threaded longitudinal bore 9a is preferably vertical ¾-16 inches in longitudinal length. Spring block 9 also preferably comprises twenty-four horizontal ¼-20 threaded spring block apertures 9f for attachment of spring assemblies 10 infra. Spring block 9 is preferably made of A36 carbon steel or 304 SS stainless steel.

There are preferably twelve spring assemblies 10 and each assembly 10 requires two bolts 11 to attach to spring block 9. Consequently there are preferably 24 spring block apertures 9f (i) within a single spring block 9 to attach spring block 9 to (ii) all spring assemblies 10 in the preferred embodiment. However, other numbers of spring assemblies 10 and bolts 11 are possible in other embodiments.

Still referring to FIGS. 6,10A, 10B, 10C and 10D, spring block 9 comprises (i) first and second lateral sides 9g, 9h, 9gg, 9hh (ii) uppermost block surface 9bb and (iii) lowermost surface 9cc with a horizontal intermediate surface 9i between spring block segments 9b and 9c. Spring block 9 also preferably comprises (i) lowermost and uppermost anterior block surfaces 9*j*, 9*jj* respectively and (ii) uppermost and lowermost posterior block surfaces 9*k*, 9*kk* respectively. Spring block 9 also comprises rectangular three-dimensional segments 9*e*, 9*ee*, with (i) first and second lateral sides 9*n*, 9*n* respectively and (ii) anterior and posterior surfaces 9*m*, 9*m* respectively. Spring block 9 (*i*) is moved vertically along, and by, adjustment screw 7 (*ii*) between spring bracket recesses 18*b*, 18*bb* infra (iii) during calibration of the spring assemblies 10 and (iv) during tank internal fluid pressure changes when (ii) tank internal fluid pressure meets or exceeds the opposing force exerted by spring assemblies 10.

This vertical movement of spring block 9 results from change in tension from coiling and/or uncoiling of leaf springs 30 of spring assemblies 10. As best seen in FIG. 6, at all times spring block 9 lies in a plane perpendicular to the vertical aligned and longitudinal length 7*g* of adjustment screw 7. Each spring bracket 13 is preferably welded to valve body flange surface 1*c*, and spring brackets 13 guide spring block 9 vertically.

Referring to FIGS. 6, 15B, 15C and 19, each spring assembly 10 is mechanically connected by first and second cap screws 10*a*, 10*b* respectively into corresponding spring assembly apertures 9*f* within most proximal lateral side 9*g*, 9*gg*, 9*h*, and 9*hh* of spring block 9. Each spring assembly 10 preferably comprises seven leaf springs 30, and each constant force leaf spring 30 is preferably (i) two inches in width and (ii) 0.0255 inch in thickness with (iii) first and second one-quarter diameter corresponding screw apertures 10*c*, 10*d* respectively. Leaf springs 30 are preferably made of 301 stainless steel, and cap screws 10*a*, 10*b* are preferably made of 18-8 stainless steel.

Referring to FIG. 6, each spring assembly 10 preferably provides 231 foot-pounds of force when that assembly 10 is deflected (uncoiled) to a longitudinal length of preferably 2.28 inches. This magnitude of force ensures that spring assemblies 10 together provide at least 2,772 foot pounds of force to exceed fluid opposing pressure of at least 2,380 foot-pounds (i) exerted through valve aperture 1*a* (ii) whenever pressure relief valve 100 is preset at 330 psi (pounds per square inch) (iii) with a preferably circular valve aperture 1*a* that is preferably 7.21 square inches. Referring to FIG. 6, each spring assembly 10 reversibly coils around a single corresponding spring drum 12. Each spring drum 12 is preferably (i) cylindrical in three-dimensional shape and (ii) made of a hard rigid material that is preferably nylon. Each spring drum 12 has a smooth hard surface 12*a* that exhibits minimal frictional resistance to corresponding reversibly coiling and uncoiling spring leaves 30.

Referring to FIGS. 6, 12A, 12B, 12C and 12D, each spring drum 12 is preferably 6.02 inches in longitudinal length. Spring drum 12 has a chamfer 12*g* on each exterior edge 12*h* to facilitate insertion into a corresponding spring assembly 10. Spring drum 12 contains an inserted corresponding cylindrical drum bolt 13 within a continuous straight spring drum bore 12*b* along the longitudinal cylindrical center line 12*f* of spring drum 12. Each cylindrical drum bolt 13 carries a single circumscribing exteriorly positioned contacting encircling corresponding spring drum 12. Each spring drum 12 with corresponding cylindrical drum bolt 13 can also preferably rotate independently from remaining spring drums 12. Coiling and uncoiling of spring assemblies 10 upon spring drums 12, and at a predetermined vertical position along spring block 9, provides the pre-calibrated constant force F150 that opposes excessive fluid pressure upon the lower surface 2*b* of sealing disk 2.

Referring to FIGS. 9, 15B, 15C and 19, each pressure relief valve 100 preferably contains twelve spring assemblies 10. When internal tank fluid pressure is below the pre-calibrated opposing force of spring assemblies 10, sealing disc 2 is mechanically compressed by the vertically downward directed force by each spring assembly 10. Each spring assembly 10 provides an opposing force through spring block 9, adjustment screw 7, sealing disk 2 and seal 3 that is equal to the force of the tank's internal pressure.

Each spring assembly 10 is attached rigidly to spring block 9 by cap screws 10*a*, 10*b*. Each spring assembly 10 can reversibly coil or coil around its corresponding spring drum 12 and drum bolt 13 clockwise or counter-clockwise. Spring drum 12 is preferably (i) made of hard nylon 6/6 material (ii) 6.02 inches in longitudinal length and (ii) one and three-quarter's inch in diameter. Spring drum 12 has a first drum end 12*c* and a second drum end 12*d*. Single centrally positioned drum bore 12*b* is preferably (i) one-half inch in diameter and (ii) co-extensive with the longitudinal length of spring drum 12. Drum exterior surface 12*a* provides an almost frictionless surface between each corresponding spring assembly 10 and drum bolt 13.

Referring to FIGS. 6, 12B, 12D, 14A, 14B and 14C, each drum bolt 13 preferably includes (i) a machined rod 13*a* with a ½-13 by ½ inch threaded end with (ii) a first opposing bolt end 13*b* and a second opposing bolt end 13*c*. Each drum bolt 13 is preferably made of A36 carbon steel or 304 SS stainless steel. Spring bolts 13 are (i) inserted through spring bracket apertures 18*d* and (ii) threaded into opposing corresponding spring bracket apertures 18*c*. Each drum bolt 13 functions as the rotating component for a corresponding spring assembly 10. Each spring bolt 11 comprises a (i) single 1/4-20 cap screw 10*a* made of 18-8SS steel and (ii) each cap screw 10*a* mechanically retains a corresponding spring assembly 10 rigidly to spring block 9. First bolt end 13*b* includes threads 13*e*, while second bolt end 13*c* comprises bolt end notch 13*d*. Bolt notch 13*d* is preferably one-quarter inch in depth, while the section of bolt 13 comprising threads 13*e* is preferably one-half inch in longitudinal length.

Figure 14A:
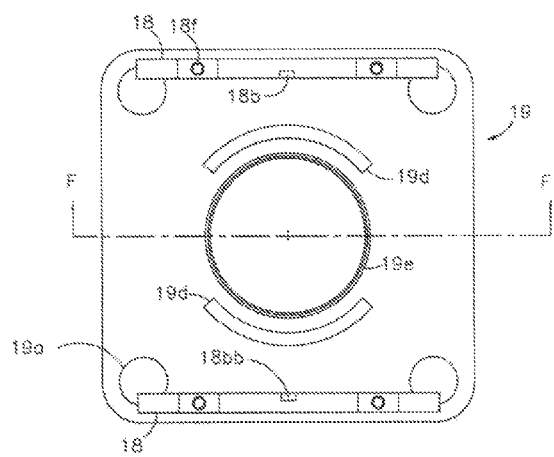
FIG. 14A illustrates a closeup isolated top plan view of the valve body for the pressure relief valve of FIG. 1 with domelike cover removed and spring brackets exposed.
Figure 14B:
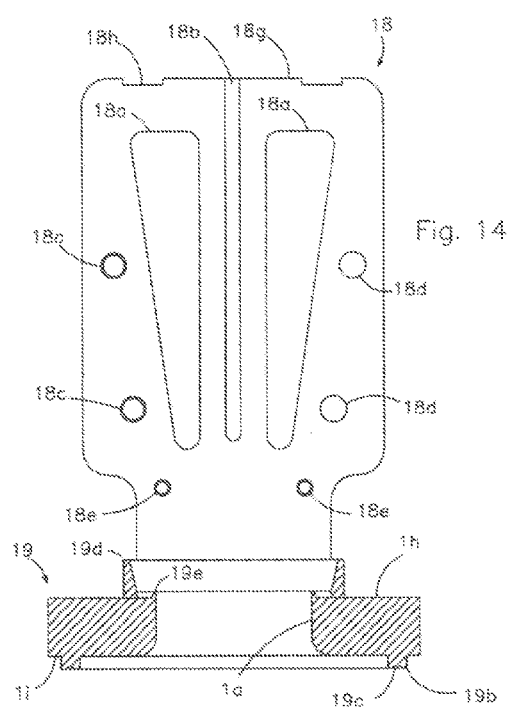
FIG. 14B illustrates a close-up isolated anterior view of a spring bracket for the pressure relief valve of FIG. 1.
Figure 14C:
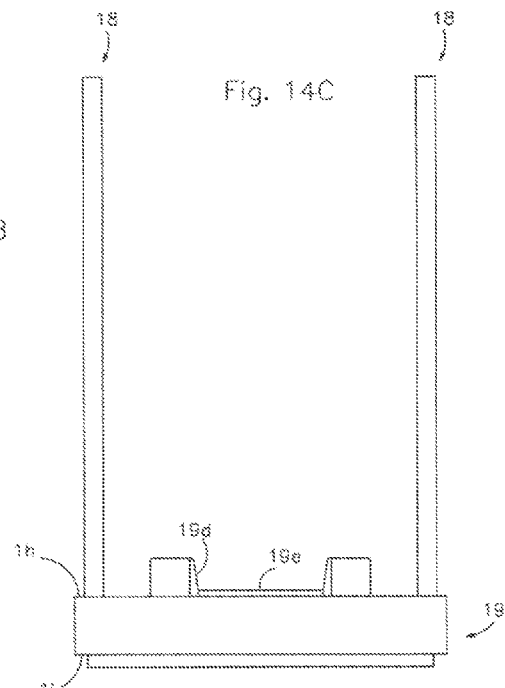
FIG. 14C illustrates a close up isolated lateral view of the spring brackets and valve body for the pressure relief valve of FIG. 1.
Figure 18:
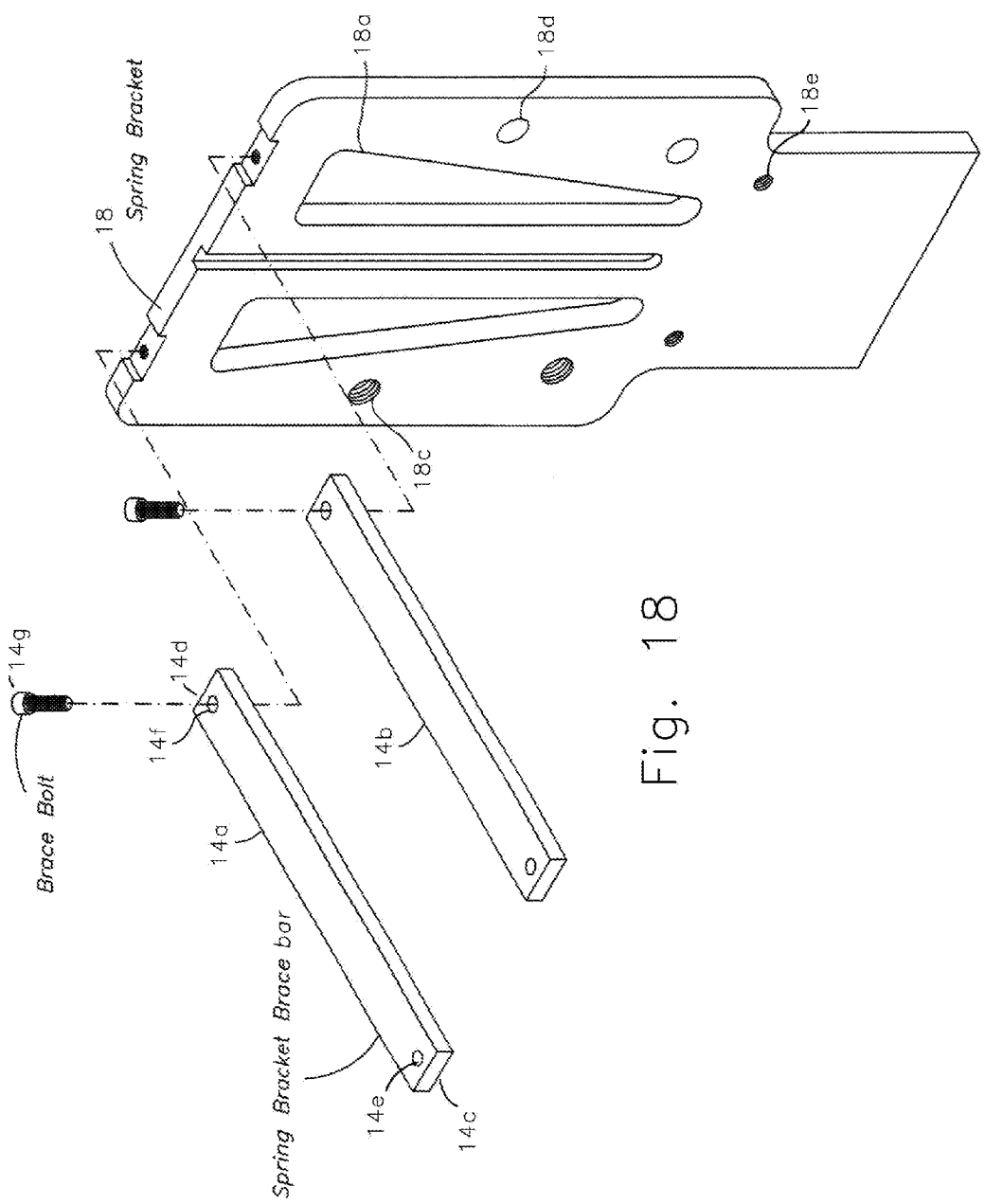
FIG. 18 illustrates an isolated exploded view of a spring bracket with attaching spring bracket braces for the pressure relief valve of FIG. 1.

Referring to FIGS. 14A, 14B and 14C, spring brackets 18 are preferably welded onto valve body flange upper surface 1*h*. Each spring bracket 18 is preferably made from A36 carbon steel or 304 SS stainless steel plate. Each spring bracket 18 is also preferably (i) approximately rectangular in shape with (ii) triangular openings 18*a* to reduce the weight of each spring bracket 18. Each spring bracket 18 (*i*) contains spring bracket apertures 18*c*, 18*d*, 18*e*, and 18*f* with (ii) spring bracket apertures 18*e* threaded to reversibly receive a corresponding cover bolt 17. Spring bracket aperture 18*f* receives a corresponding brace bolt 15. Spring brackets 18 each include preferably machined first and second vertical rectangular slots 18*b*, 18*bb*. Slots 18*b* or 18*b* mate with corresponding spring block 9 first and second lateral projections 9*e*, 9*ee* respectively. Please see FIG. 10A. Spring bracket recess 18*h* is preferably machined into top bracket surface 18*g* to create a rigid joint with spring bracket brace 14 infra. Please see FIG. 14B.

Valve body flange 19 is preferably made of A516 grade 70 steel or 316L stainless steel. Valve body flange 19 contains preferably (i) circular aperture 1*a* and (ii) a plurality of apertures 19*a* for receiving tank mounting studs. Valve body flange 19 has (i) an upper flange surface 1*h* (ii) a lower flange surface 1*i* and (iii) a rectangular cross-sectioned tongue 19*b* projecting from lower flange surface 1*i*. Tongue 19*b* contains two circular grooves 19*c* that (i) are each preferably one-sixteenth inch in depth and (ii) improve the effectiveness of the mounting gasket seal. Valve body flange 19 also preferably includes two semi-circular triangular cross sectional disc guides 19d, and guides 19d ensure that sealing disc 2 is held consistently onto flange seat 19e.

Referring to FIG. 6, each first and second spring bracket brace bar 14a, 14b respectively is preferably (i) rectangular in cross-section and (ii) six and seven-eighths inch in longitudinal length. Each spring bracket brace bar 14a, 14b [collectively spring bracket brace bars 14] has a first opposing end 14c and a second opposing end 14d. Preferably a corresponding single first and second spring bracket aperture 14e, 14f respectively is located at each opposing spring bracket brace bar end 14c, 14d respectively. Each spring bracket aperture 14e, 14f is preferably 0.256 inch in depth.

Spring bracket brace 14 eliminates binding of spring block 9 as it moves vertically during (i) valve presetting precalibration or (ii) whenever tank fluid internal pressure raises equals or is great than opposing vertically aligned force from pre-calibrated spring assemblies 10. Preferably each spring bracket brace 14 is made of A36 carbon steel. Each brace bolt 15 is preferably a (i) a ¼-20 by ¾ inch longitudinal length socket head cap screw 14g (ii) made of alloy steel or stainless steel. Each brace bolt 15 retains a corresponding spring bracket brace bar 14a, 14b rigidly to spring bracket(s) 18.

Referring to FIGS. 4A, 6, 16A, 16B and 16C, single protective domelike valve cover 16 preferably comprises a (i) single domelike body 16a (ii) a single top plate 16b and (iii) first and second domelike legs 16i, 16ii respectively. Valve cover body 16a is preferably made from an A36 steel 12 gauge plate, and valve cover body 16a and single top plate 16b are attached by weld 16j. Valve cover 16 (i) provides a roof-like structure over valve body 1 and (ii) preferably completely shelters all spring assemblies 10. Valve domelike cover 16 includes a valve cover upper surface 16f and a valve cover lower surface 16g.

Valve cover 16 also preferably comprises a single circular opening 16c through which adjustment screw wrenching element 7d rises when valve 100 is flowing fully. Valve cover 16 preferably (i) mechanically attaches to spring brackets 18 by a plurality of cover bolts 17 (iii) inserted through apertures 16g and threaded into spring bracket apertures 18e. Domelike cover 16 (i) protects valve components from weather and (iii) prevents access to, and tampering with, valve components. Each cover bolt 17 is preferably (i) 5/16-18 by 3.4 inch in longitudinal length.

II. Assembly, Calibration and Operation of the Preferred Embodiment

The pressure at which pressure relief valve 100 opens depends upon tank internal pressure: Whenever the tank internal pressure exceeds valve 100 STD, then valve 100 will begin to discharge. As an example, but not limited to the above described embodiments or the values specified, a representative pressure relief valve pre-calibration based upon a representative internal tank pressure proceeds as follows:
1. Required internal opening pressure P1 to equal valve disk pressure P2: 330 psi;
2. Diameter of valve aperture D: 3.03 inches;
3. Constant opposing restoring force F2 per spring assembly 10: 2380 foot-pounds/minute.
4. Required number of spring assemblies 10: 12.

Figure 8:
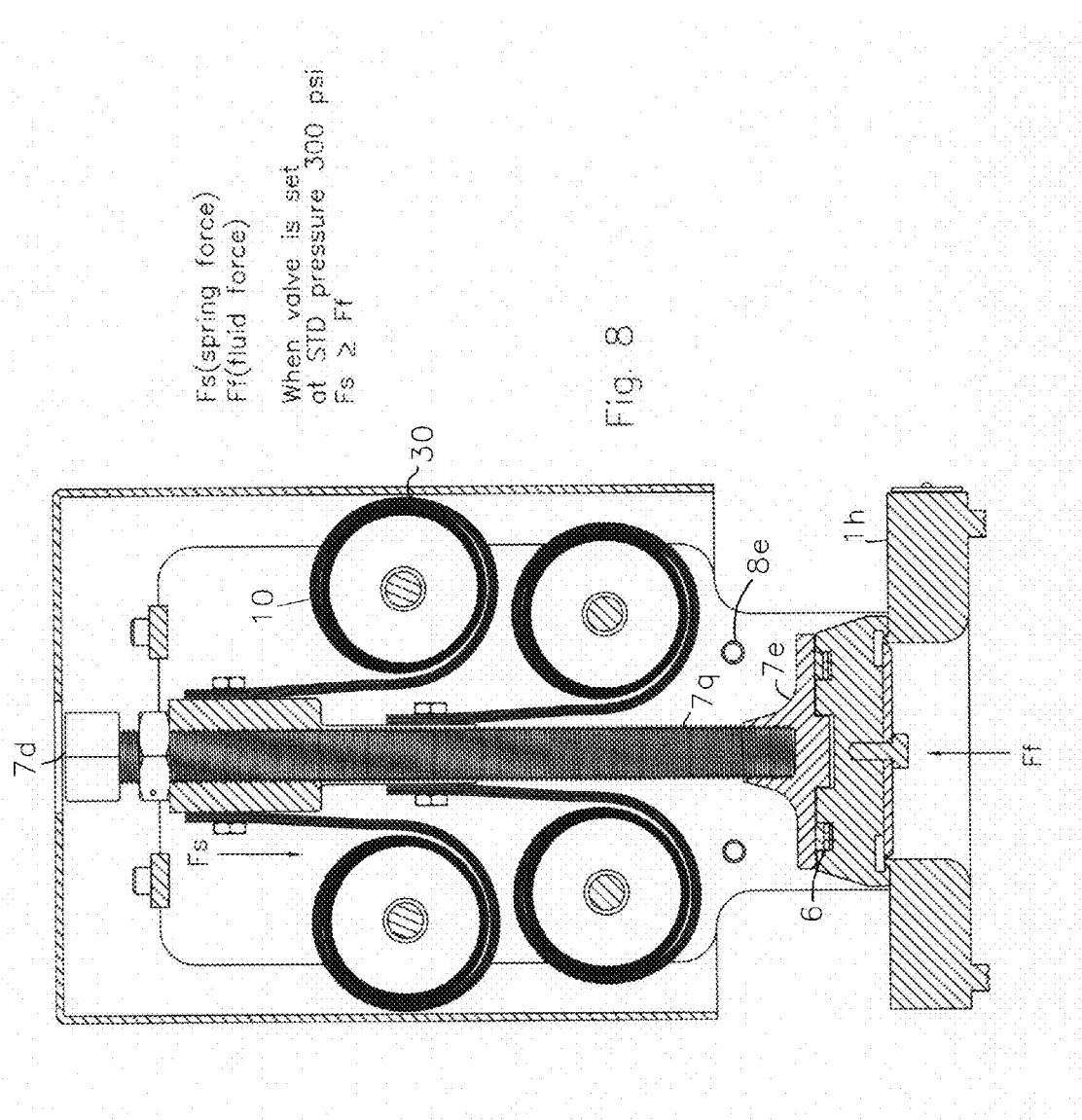
FIG. 8 illustrates a lateral cutaway view of the pressure relief valve of FIG. 1 in a closed configuration when the internal tank pressure equals the opposing fore of the valve's spring assemblies.

Referring to FIG. 8, the valve manufacture preferably initially sets the pressure relief valve 100 to the appropriate discharge pressure based upon the above calculation. For the preferred pressure relief valve 100 this measurement is preferably 330 pounds psi [pounds per square inch]. To begin, the pressure relief valve 100 is preset to this measurement by installing the valve 100 onto a suitable test device. This test device preferably includes a flange mounted to a surface (i) with sufficient fittings to pressurize the flange and attached pressure relief valve (ii) with one or more calibrated pressure gauges.

Next, adjustment screw 7 is rotated a predetermined length: force from rotating adjustment screw 7 by wrenching element 7d causes attached spring block 9 to vertically elevate. This elevation deflects the attached spring assemblies 10 (which coil or uncoil) to a predetermined length. The deflected spring assemblies 10 translate this force to seal 3 against valve seat 1d. The operator than makes adjustments by rotating adjustment screw 7 until STD pressure (preferably 330+/−3%) is achieved. The valve's preset pressure measurement is recorded and mechanically locked into place by jam nut 8.

Referring to FIGS. 1 and 9, thereafter the customer installs the pressure relief valve 100 valve upon the upper surface 54 of the tank car 52. When tank car 52 exhibits an internal fluid pressure less than the force from pre-calibrated spring assemblies 10 (i) there should be no leakage and (ii) sealing disk 2 does not separate from valve seat 1d. If and when tank internal fluid pressure equals the pre-calibrated spring force, then pressure relief valve will vent fluid but sealing disc will not completely disengage from valve seat 1d. When tank internal fluid pressure reaches 110% of the spring assembly opposing force, then sealing disk 2 will completely vertically disengage from valve seat 1d, and spring block 9 will maximally elevate above tank aperture 51. At this time tank aperture 51, valve body aperture 1a and opening 16a are continuous with each other and fluid rapidly escapes therefrom the tank. This process is also operable in embodiments in which there is a large container, although not a rail car, with (i) a similar fluid dynamic and (ii) an appropriate opening and attachment for the pressure relief valve 100.

When tank pressure falls below this pre-calibrated value after fluid venting, sealing disc 2 will fall vertically and reseat onto valve seat 1d. Sealing disk 2, together with seal retainer 4 and seal 3 are realigned to prevent vapor and liquid from leakage until another pressure overage occurs. In the preferred embodiment, upper container or tank surface 51 comprises tank mounting flange gasket groove 40 that is greater in all dimensions than pressure relive valve flange tongue 41. Tank mounting flange gasket groove has (i) an outer diameter of preferably 6.745 inch, (ii) an inner diameter of approximately 6.005 inch and (iii) a height of preferably approximately 0.025 inch.

The installer places a single pressure relief gasket 44 within tank mounting flange groove 40. Pressure relief gasket 44 is preferably approximately 0.125 inch in thickness and (ii) an elastomeric material or hard rigid composite from the group consisting of (i) ethylene propylene diene monomers, compressed fiber sheet gasket materials, co-polymers of hexaflouropropylene, vinylidene fluoride, ter-polymers of tetrafluoroethylene; vinylidene flouride, hexafluoropropylene and perfloromethylvinyl ethers. The installer (i) lowers the pressure relief valve 100 into groove 40 and (ii) aligns the valve's four 15/16 inch diameter bolt apertures with the tank upper surface's four mounting studs 57a, 57b, 57c, 57d [collectively mounting studs 57]. Each mounting stud 57 is preferably approximately ⅞ inch in diameter.

The install next applies four nuts 58a, 58b, 58c, 58d, each preferably of ⅞ inch diameter, to corresponding studs 57a, 57b, 57c, 57d protruding above valve flange 1h. The installer tightens bolts in a criss-cross bolting pattern by which (i) each bolts is tightened and (ii) thereafter an opposing bolt is tightened in a manner well known in this particular industry. During this procedure each bolt is tightened to a torque of preferably 400-600 foot pounds. The installer finally pressurizes the tank car and tests for leaks at the joint created by and between the valve flange and the tank flange.

The above description includes the preferred embodiment and other embodiments and best modes of the invention. However, this description not preclude still other embodiments, modes, changes in the details, materials, steps and arrangement of the invention that lie within the principle and scope of the above described invention, and as designated in the appended claims.

The invention claimed is:

1. An integral single component spring bracket, said spring bracket comprising a first single lateral side, a second single lateral side, an upper spring bracket edge, a lower spring bracket edge, a single flat anterior side and a single flat posterior side,
    said single flat anterior side and said single flat posterior side congruently aligning with each other and being integral with each other,
    said spring bracket further comprising six vertically aligned spring bracket apertures penetrating said single flat anterior side and said single flat posterior side, and
    wherein two of said six spring bracket apertures penetrating said single flat anterior side and said single flat posterior side are threaded,
    said spring bracket further comprising an additional two said spring bracket apertures within and as part of said upper spring bracket edge,
    said spring bracket further comprising a single rigid vertical structure within and as part of said single flat posterior side,
    said single rigid vertical structure comprising rigid walls, said single rigid vertical structure mechanically retaining another device within said rigid walls so said another device exclusively moves vertically in a linear manner.

2. The spring bracket of claim 1 wherein said upper spring bracket edge comprises a first single spring bracket recess and a second single spring bracket recess, and
    each said first single spring bracket recess and said second single spring bracket recess being located within and integrally part of said upper spring bracket edge, and
    wherein each of said two said spring bracket apertures within said upper spring bracket edge is located within a corresponding said first spring bracket recess or said second spring bracket recess.

3. The spring bracket of claim 1 wherein said single vertical structure comprising rigid walls comprises a vertical rectangular slot.

4. The spring bracket of claim 1 wherein said spring bracket attaches to a constant force spring assembly with two drum bolts, said two drum bolts inserting within said vertically aligned apertures within said spring bracket.

5. The spring bracket of claim 1 wherein said rigid vertical walls retain said another device in sliding alignment and said another device comprises a constant force spring assembly attaching component.

6. The spring bracket of claim 5 wherein said constant force spring assembly attaching component comprises a spring block.

7. The spring bracket of claim 1 wherein said upper edge of said spring bracket comprises rigid attaching components by which to attach to said upper edge of a second spring bracket.

8. The spring bracket of claim 1 wherein said rigid attaching components comprise brace bars.

9. The spring bracket of claim 1 wherein said spring bracket posterior and anterior sides each comprise triangular cutouts.

\* \* \* \* \*